| DECIMAL CODE | TELEGRAPH CODE | | | | |
|---|---|---|---|---|---|
| | 1 | 2 | 3 | 4 | 5 |
| 0 | X | X | | | |
| 1 | X | X | X | | X |
| 2 | X | X | | | X |
| 3 | X | | | | |
| 4 | | X | | X | |
| 5 | | | | | X |
| 6 | X | | X | | X |
| 7 | X | X | X | | |
| 8 | | X | X | | |
| 9 | | | | X | X |
| 10 | | X | X | | X |

INVENTOR
W. RIGGEN
BY Donald M. Duft
ATTORNEY

INVENTOR
W. RIGGEN
BY
Donald M Craft
ATTORNEY

INVENTOR
W. RIGGEN
BY
Donald M Seift
ATTORNEY

April 25, 1961 W. RIGGEN 2,981,799

DATA RECORDING SYSTEM

Filed June 16, 1958 10 Sheets-Sheet 4

INVENTOR
W. RIGGEN
BY
Donald M Duft
ATTORNEY

April 25, 1961 W. RIGGEN 2,981,799

DATA RECORDING SYSTEM

Filed June 16, 1958 10 Sheets-Sheet 5

INVENTOR
W. RIGGEN
BY Donald M Duft
ATTORNEY

INVENTOR
W. RIGGEN
BY
Donald M Duft
ATTORNEY

INVENTOR
W. RIGGEN
BY Donald M Duft
ATTORNEY

April 25, 1961 W. RIGGEN 2,981,799

DATA RECORDING SYSTEM

Filed June 16, 1958

10 Sheets-Sheet 8

INVENTOR
W. RIGGEN
BY
Donald M. Cluft
ATTORNEY

April 25, 1961 W. RIGGEN 2,981,799

DATA RECORDING SYSTEM

Filed June 16, 1958 10 Sheets-Sheet 9

INVENTOR
W. RIGGEN
BY Donald M Duft
ATTORNEY

April 25, 1961 W. RIGGEN 2,981,799

DATA RECORDING SYSTEM

Filed June 16, 1958 10 Sheets-Sheet 10

INVENTOR
W. RIGGEN
BY Donald M Duft
ATTORNEY 2,981,799

DATA RECORDING SYSTEM

Winnifred Riggen, Joliet, Ill., assignor to American Telephone and Telegraph Company, a corporation of New York Filed June 16, 1958, Ser. No. 742,094

6 Claims. (Cl. 179—8)

Figures 1, 2:
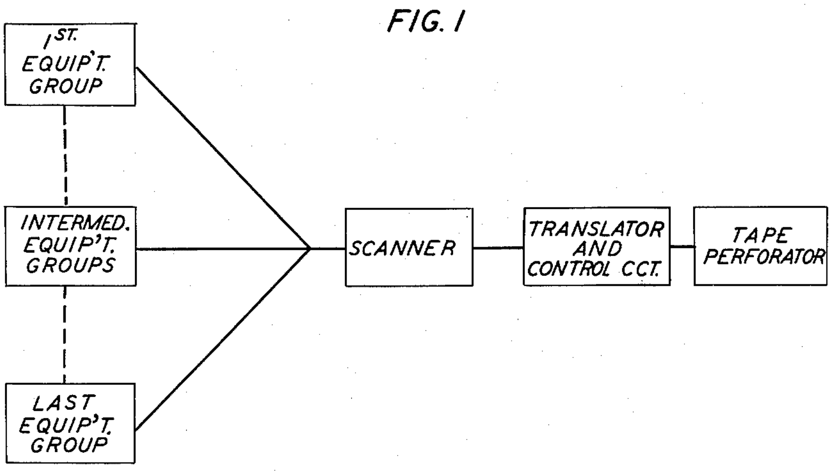
Figure 3:
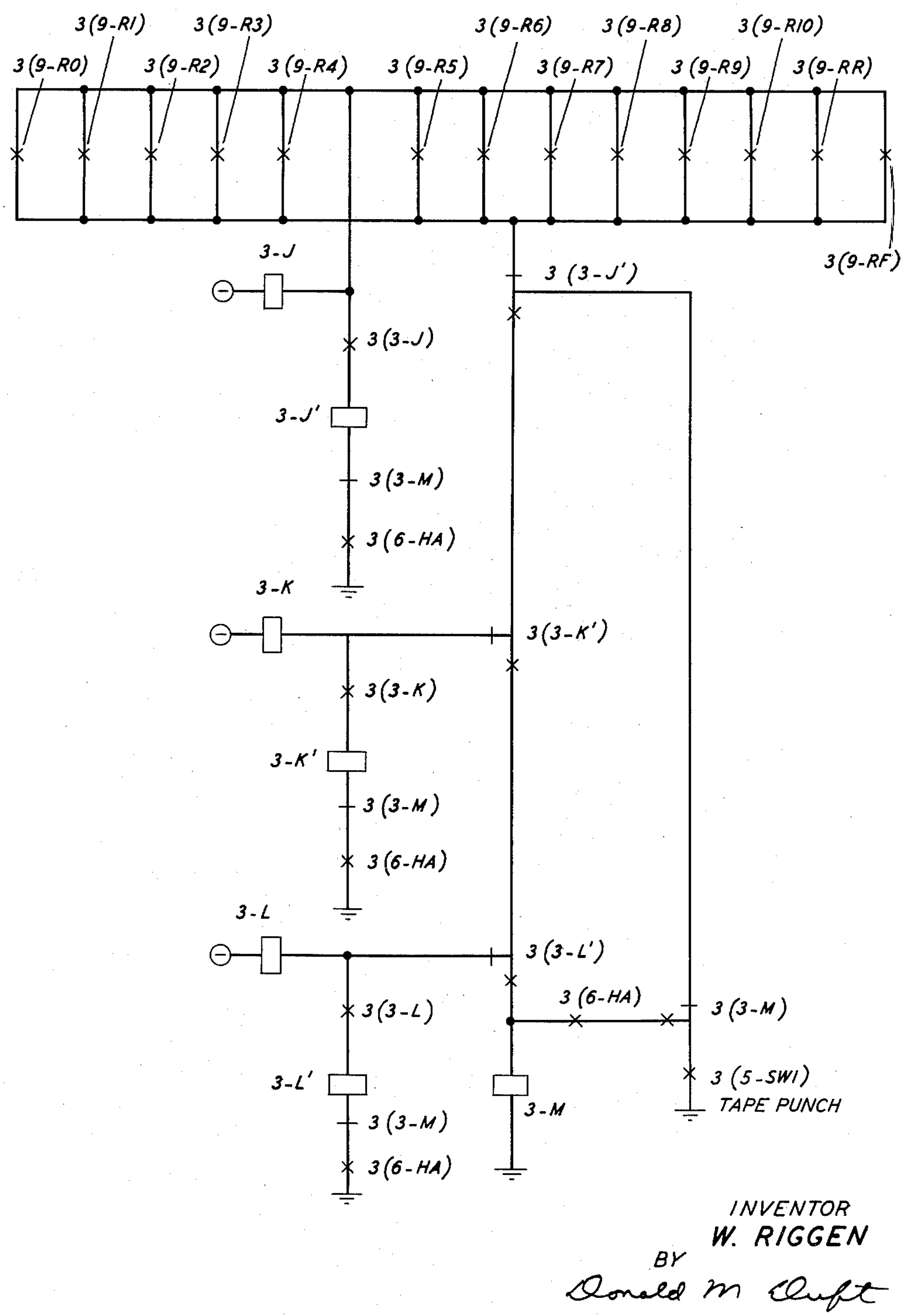

This invention relates to a data recording system and, more particularly, to a data recording system which periodically scans a plurality of groups of equipment and, in response thereto, first determines the number of busy units in each group and, secondly, records on a suitable medium the busy data for each group.

It is a well-known truism that any business concern with production or operating facilities should utilize said facilities at the highest maximum average occupancy consistent with economy and dependability of operation. This point is reached when the optimum number of facilities are furnished for the job to be performed. For example, it obviously would be economically unwise to provide such a large quantity of machinery that all of it would never be used simultaneously except during rarely occurring peak periods of activity. Also, it would be economically unwise to provide such a small quantity of machinery of one type that the rest of the production or operating facilities would be slowed down because of the limited capacity of these few machines.

In the telephone industry the problem of providing optimum service together with economy of operation manifests itself in a number of instances, including, for example, the determination of the optimum number of communication paths that are to be provided between any two points. It is highly important to any telephone company that it provide neither more nor less equipment than is necessary to render adequate service. For example, if a company provides too little equipment, the service would be inadequate since many subscribers would receive a busy tone and would be unable to complete their calls without delay. Also, it would be just as unwise to provide such a vast number of equipment that most of it would be busy only during some theoretically possible but actually improbable peak load, such as if every subscriber should simultaneously attempt to place a call.

Most telephone systems are designed so that the average occupancy of the equipment is near the 100 percent level only during peak periods that may be reasonably expected to occur. This goal of 100 percent is rarely attained since it is common practice to provide reserve equipment in order to provide for unexpected emergencies.

In line with these objectives, it is desirable that frequent studies be made regarding the usage of facilities already in service so that additional equipment may be ordered when it appears that the present facilities are no longer sufficient to give satisfactory service. The equipment used in the past to perform such studies and to furnish the desired data has not been as satisfactory as desired. An obvious method of deriving such data, and one that has been used in the past, is to attach a time recording device to each unit or circuit in the group under study and then periodicaly compute the desired information from the recorded data. The disadvantage with this method is that the compilation of the data from the recording machines is a laborious process.

Another method used in the prior art involves the use of a resistive network and an ammeter. The resistance of the resistive network is caused to vary in accordance with the percent of occupancy of a group of units or circuits, and as the resistance varies, the current through the ammeter, varying similarly, can be observed and recorded. The current at any one time will be representative of the occupancy of the group at that instant. This method of deriving data is difficult to use in situations where the busy time of the equipment may be in the order of one or two seconds, or less.

The present invention provides a new and improved means of recording data pertaining to the number of circuits found busy at each of a plurality of groups of circuits. It is equally well suited for use with equipment having a short busy time as with equipment having a long busy period.

Accordingly, it is an object of the invention to facilitate the determination of the number of circuits found busy in each of a plurality of groups of circuits.

It is a further object of the invention to provide a means for recording the number of circuits found busy in each of a plurality of groups of circuits during a given time interval.

In the particular embodiment of the invention disclosed herein it is assumed that the plurality of groups under study comprise various types of telephone circuits. However, it is to be understood that this showing is only illustrative and that the present invention could equally well be used where the groups comprise any type of production or operating facilities.

In accordance with the present invention, a scanner, a translator, and a tape perforator are associated with an office having groups of circuits whose occupancy rate is to be determined. This specification discloses one hundred such groups with each individual group comprising twelve subgroups of ten circuits each. Each group may represent any equipment whose occupancy rate it is desired to determine. For example, one group could represent line finder circuits in a step-by-step office. Another group could represent first selector circuits, another group second selector circuits. Still another group could represent connector circuits and so on, so that the one hundred different groups may represent up to one hundred different types of circuits.

The scanner sequentially scans the one hundred groups, and during each scan the translator is sequentially connected by the scanner to each group, and then sequentially to the twelve subgroups within each group, in order to determine how many of the individual circuits therein are busy. The translator makes this determination and, in turn, controls the perforation of this information on an output tape.

A separate digit is perforated for each scanned subgroup of ten circuits. The numerical value of each digit represents the number of circuits found busy in the associated subgroup. Each group comprises twelve subgroups and, therefore, twelve digits are perforated for each group. The entire system works at sufficient speed so that the one hundred groups may be scanned every five minutes and the derived information pertaining thereto perforated on an output tape. In other words, during each five minute period the translator determines the busy or idle condition of 12,000 (100×12×10) individual circu.ts and, in response thereto, controls the perforation of 1200 digits.

The perforated data is arranged on the tape in a manner to facilitate its ultimate perforation on business machine cards at a data processing center. The conventional business machine card has eighty data columns, and therefore the information on the tape is spaced in accordance with the amount that will fit onto each card.

The perforated tapes in each office are collected and once a day are read by a tape reader which, in response thereto, transmits the data over a communication path to a centrally located data processing center.

A 2-digit office code is also perforated on each tape for identificaion purposes, since the data processing center receives information of this type from a plurality of offices. The office code is perforated at selected intervals on the tape, so that the first two digits perforated on each business machine card are the 2-digit office code identifying the particular office the rest of the information on the card represents. Also, for statistical reasons, it is desired that each of the hundred groups be identified by a code and, therefore, the busy data pertaining to each group is preceded by a 2-digit group code. With this arrangement, the first two digits on each card represent the office code, the second two digits the group code, while the following twelve digits represent the busy data for a first group. Following this, the next two digits represent the code of the next group while the following twelve digits represents the busy data for this group. Each card, when perforated as above, contains an office code and busy data for five groups together with the 2-digit code of each group.

A feature of the invention is the provision of a scanner for sequentially connecting a transulator to each of a plurality of circuit groups in order to determine how many individual circuits in each group are busy.

A further feature of the invention is the provision of a scanner, translator, and a recorder for sequentially determining and recording how many individual circuits in each of a plurality of circuit groups are in a busy condition.

A further feature of the invention is the provision of a scanner and a sub-scanner for first sequentially connecting a translator to each of a plurality of circuit groups and then to each of a plurality of subgroups within each group in order to determine the number of busy circuits within each subgroup.

A further feature of the invention is the provision of a scanner, a sub-scanner, a translator and a recorder for sequentially determining and then recording the number of busy circuits in each of a plurality of subgroups of circuits.

A further feature of the invention is the provision of a scanner which sequentially connects a translator and recorder to each of a plurality of circuit groups in combination with a timing means for controlling the sequential operation of a sub-scanner for connecting the translator and recorder sequentially to each of a plurality of subgroups of circuits within each group in order to determine and record the number of busy circuits within each subgroup.

Figure 11:
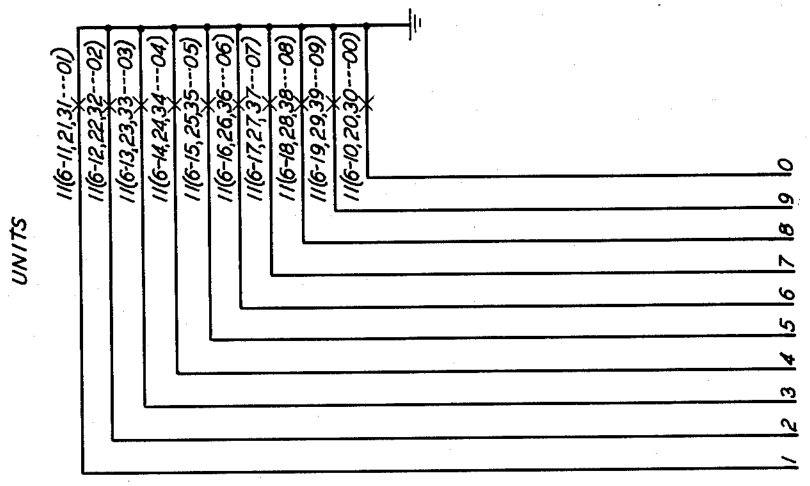
Figure 12:
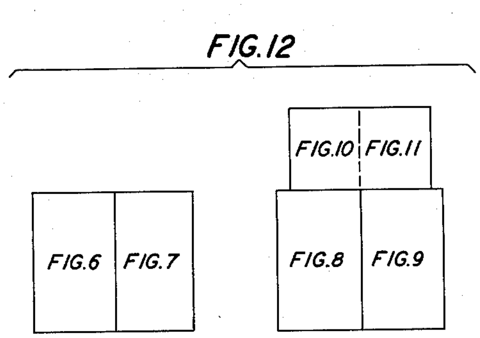
Figure 13:
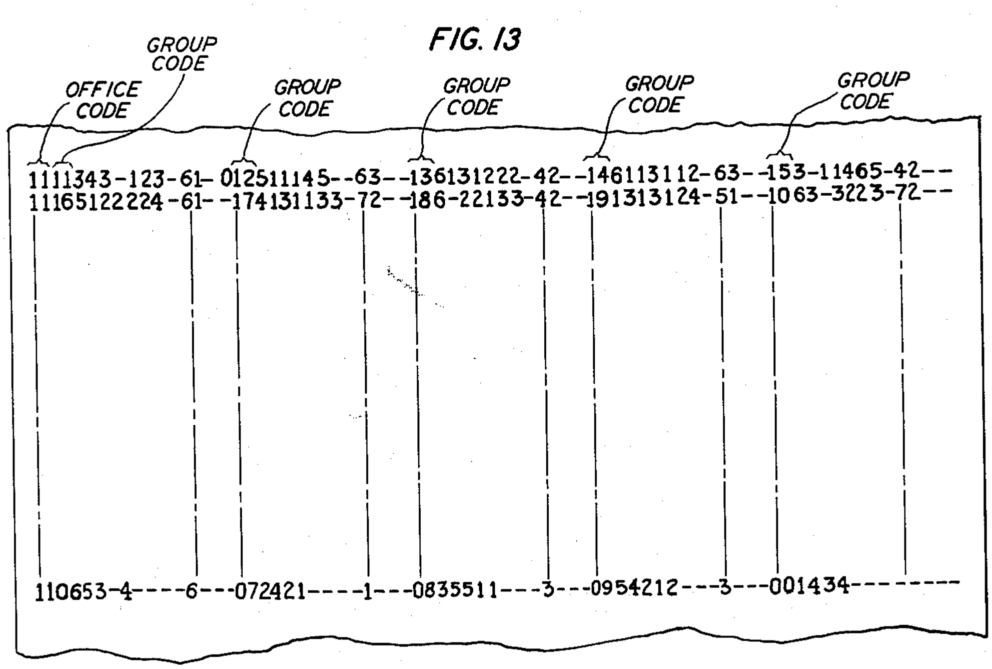

These and other features and objects of the invention will become apparent upon consideration of the following description taken in conjunction with the drawings in which:

Fig. 1 illustrates the relationship between the various components utilized in the system comprising the present invention;

Fig. 2 contains a table showing the relationship between the decimal code and the telegraphic code utilized by the recorder disclosed herein;

Figs. 3 through 11 comprise the circuit of the present invention;

Fig. 12 shows how Figs. 6 and 7, and 8 through 11 should be arranged with respect to each other; and Fig. 13 discloses a sample resultant end product obtained when the data on the output tape of the present invention is read by a record controlled printer.

1.0 GENERAL DESCRIPTION

Fig. 1 shows the relationship between the various elements comprising the present invention. These elements comprise a plurality of equipment groups, a scanner, a translator and control circuit, together with a tape perforator. The left-most boxes represent the plurality of equipment groups whose occupancy is to be determined. There are shown a first equipment group, a last equipment group, and a plurality of intermediate equipment groups. In the present disclosure it is assumed that 100 such groups are to be studied and, therefore, the top left-most box representes equipment group 1, the next box represents equipment groups 2 through 99, while the bottom box represents equipment group 100. The lines interconnecting each equipment group on Fig. 1 with the scanner represent the test leads for the circuits within each group whose occupancy is to be measured. The exact nature of the connections within each group may vary somewhat in accordance with the nature of the specific equipment represented thereby. The only requirement for the connections is that they apply a signal of one type to the scanner when their associated circuits are busy and a signal of another type when their circuits are idle.

The scanner comprises a switching means which sequentially interconnects each equipment group with the translator and control circuit. The translator and control circuit determine the number of occupied circuits in each group and, in turn, controls the perforation of this information on a paper tape.

In the present disclosure, each equipment group is assumed to contain 120 individual circuits which are subdivided into twelve subgroups of ten circuits each. The scanner connects the translater and control circuit to the 120 circuits within a group. The translator has a capacity for testing only ten circuits at a time and therefore, a sub-scanner is used in order to sequentially interconnect the translator with the twelve subgroups as it is connected by the scanner to a particular equipment group. The translator determines how many of the ten circuits in each subgroup are busy and, in turn, controls the perforation of this information on a paper tape.

In the drawings, the relay contacts are shown detached from the relay windings. The first digit or pair of digits of each relay designation indicates the figure on which the relay winding appears while the letters represent the function thereof. Relay 6–HA, for example appears on Fig. 6. The designation of relay contacts includes in parentheses the controlling relay's designation with the digits before the parentheses indicating the figure in which the contacts appear. Contacts 8(6–HA), for example, appear in Fig. 8.

Contacts which are closed when the relay is operated (make contacts) are represented by an X crossing the lines representing the connecting conductors while contacts which open when the relay is operated (break contacts) are represented by a short line crossing the connecting conductors.

Figure 6:
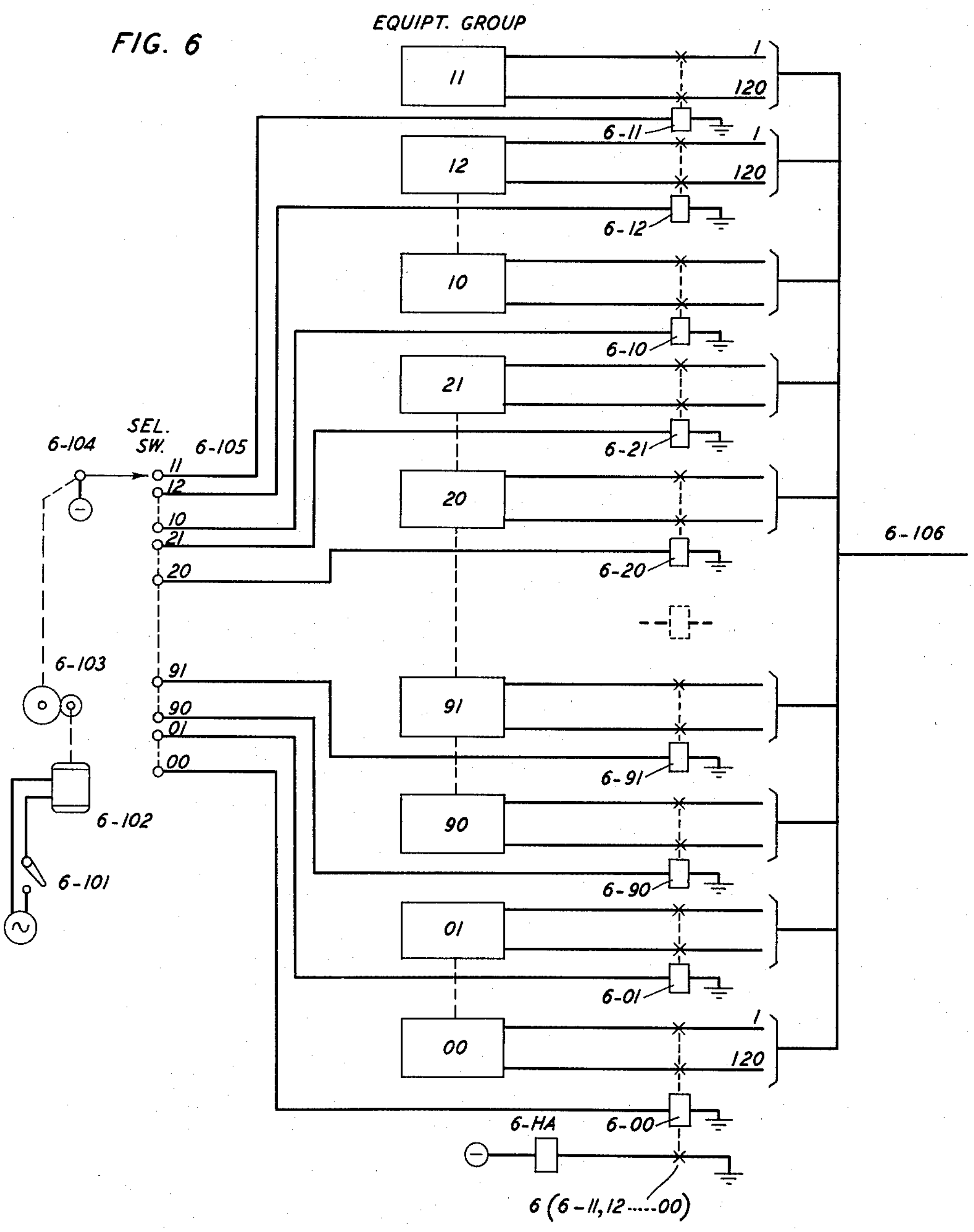
Figure 7:
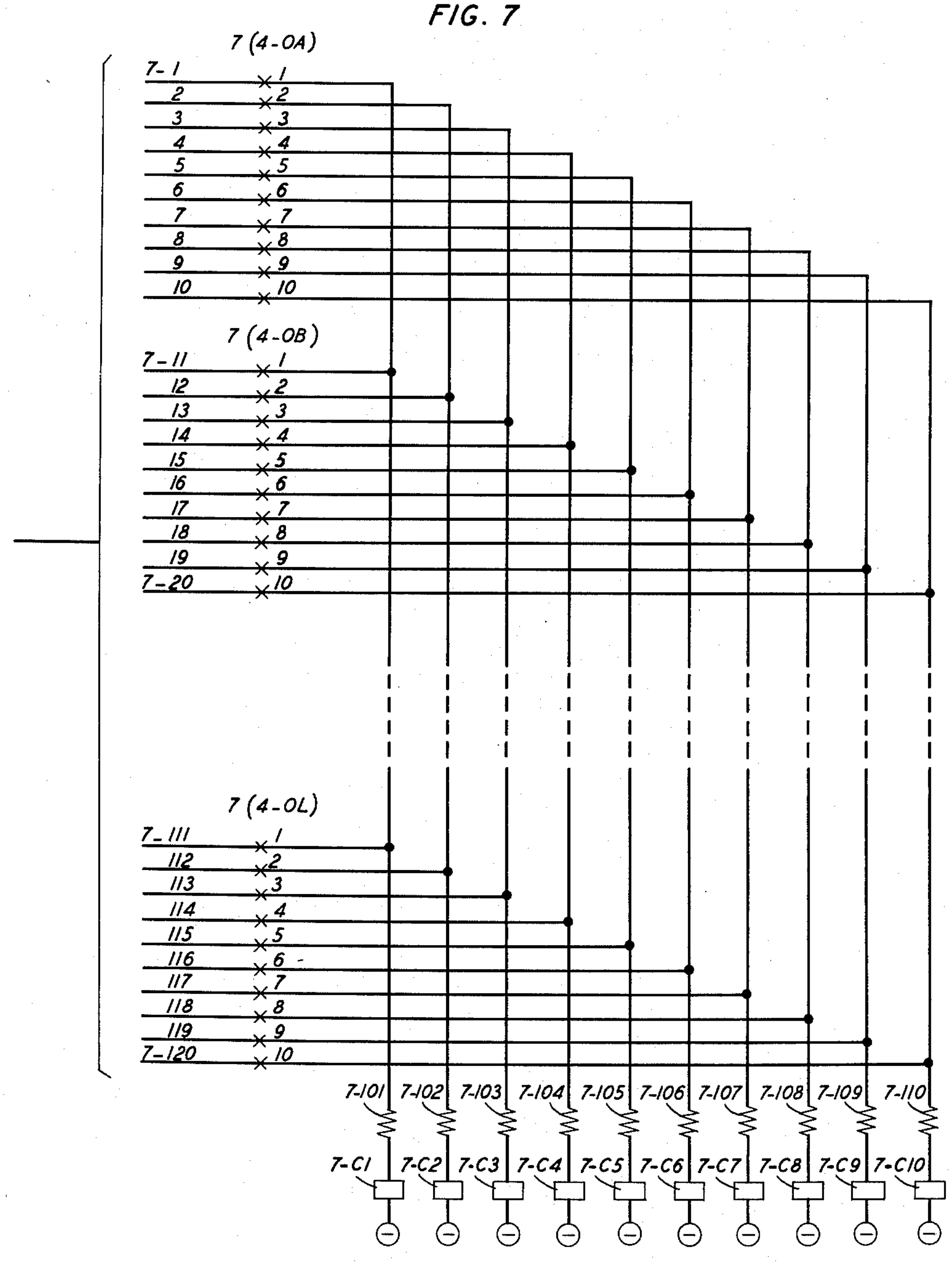

The 100 equipment groups together with the scanner are shown in detail on Fig. 6, while a portion of the sub-scanner and the input circuit for the translator is shown in detail on Fig. 7. Of the 100 equipment groups, the first ten are represented on Fig. 6 by the boxes 11, and 12 through 10, the second ten are represented by boxes 21 through 20, while the last ten of the 100 are represented by the boxes 01 through 00 with box 00 representing the hundredth group. One hundred relays, designated 6–11 through 6–00 are associated with the corresponding ones of equipment groups 11 through 00. Each equipment group has 120 test leads connected to 120 make contacts on its associated relay. The make contacts on each of relays 6–11 through 6–00, when operated, interconnect the 120 test leads from its associated group with corresponding ones of leads 7–1 through 7–120 on Fig. 7.

Relays 6–11 through 6–00 are sequentially operated by a selector switch 6–105. The closure of switch 6–101 energizes motor 6–102 which rotates rotor 6–104 of selector switch 6–105 through a gear reduction train 6–103. The rotor sequentially engages the contacts of the selector switch in positions 11, and 12 through 00, in that order. Each of relays 6-11 through 6-00 is connected to one of contacts 11 through 00. As the rotor engages each contact, it applies a battery to the winding of the relay associated therewith, thereby operating it. For example, when switch 6-101 is operated thereby energizing motor 6-102 and initiating the advance of rotor 6-104, the rotor first engages the contact in position 11 from which a wire runs to the winding of relay 6-11. The negative battery on rotor 6-104 now energizes relay 6-11 by virtue of the ground on the other side of its winding. The operation of relay 6-11 closes its 120 make contacts and extends the 120 test leads for equipment group 11 through cable 6-106 to the corresponding ones of leads 7-1 through 7-120 on Fig. 7.

The translator has ten input relays 7-C1 through 7-C10. It is these relays which are interconnected with the test leads from the equipment groups to determine the occupancy of the various circuits therein. Since there are 120 test leads to be tested in each group and only ten input relays, the 120 test leads per group are subdivided into twelve groups of ten each by contacts 1 through 10 on each of relays 7-OA, 7-OB through 7-OL. These relay contacts, together with the energizing circuits for their relay windings, comprise a sub-scanner which sequentially connects each of the twelve subgroups with input relays 7-C1 through 7-C10. For example, after relay 6-11 has operated to interconnect the 120 test leads from group 11 with leads 7-1 through 7-120, relay 7-OA is first operated to interconnect leads 7-1 through 7-10 with relays 7-C1 through 7-C10. Each relay either operates or remains idle at this time, depending upon whether or not there is a ground on the test lead to which it is currently connected. In this specification it is assumed that ground on a test lead represents an occupied circuit, while the absence of ground indicates an idle circuit. The operated ones of relay 7-C1 through 7-C10 control other circuits within the translator which, in turn, effect the perforation in a telegraph code of one of digits 0 through 10 on an output tape. The magnitude of the perforated digit indicates the number of circuits now busy in the ten leads to which the input relays are currently interconnected.

Next, relay 7-OA releases and 7-OB operates to interconnect leads 7-11 through 7-20 with the input relays which, in turn, effect the perforation of a second digit on the tape. Next, relay 7-OB releases and relays 7-OC through 7-OL operate and release sequentially thereby interconnecting these ten input relays sequentially with each of the remaining ten subgroups of circuits of group 11. The input relays, in turn, control the perforation of one of digits 0 through 10 as it is connected with each subgroup.

Summarizing to date, the input relays 7-C1 through 7-C10 have, by means of relays 6-11 and 7-OA through 7-OL, been sequentially interconnected with the twelve subgroups of circuits comprising equipment group 12. As a consequence, twelve digits have been perforated on an output tape with the value of each digit manifesting the number of circuits found busy in the subgroup represented thereby.

Next, rotor 6-104 advances to position 12, thereby effecting the release of relay 6-11 and the operation of relay 6-12. This, in turn, disconnects the 120 test leads of group 11 and connects the 120 test leads from group 12 to the circuits of Fig. 7. The sub-scanner now operates as previously described and sequentially connects the ten input relays with each of the twelve subgroups of group 12. As a result, twelve digits are perforated on the tape representing the occupancy of the twelve subgroups comprising group 12.

The operation of the circuits on Figs. 6 and 7 continues in a manner similar to that already described, so that relays 7-C1 through 7-C10 are sequentially interconnected with the test leads of the remaining equipment groups and subgroups in order to determine the occupancy thereof and, in turn, effect the perforation of this information on the tape.

Fig. 2 contains a table showing the code used to perforate the occupancy data on the paper tape. Each of the five numbered columns under the telegraph code portion of the table represents one of the five perforator magnets 5-P1 through 5-P5 in the tape perforator of Fig. 5. This perforator is the same type as that shown in Patent No. 2,675,078 to W. J. Zenner, issued April 13, 1954, which discloses a high-speed tape perforator. Magnets 33 of the Zenner patent corresponds to magnets 5-P1 through 5-P5 on Fig. 5. Magnet 59 of the Zenner patent corresponds to the tape feed magnet 5-TF. The table of Fig. 2 shows the punch magnets which are operated during the perforation of each of digits 0 through 10. For example, magnets 5-P1 and 5-P2 are operated to perforate the digit 0, while magnets 5-P2, 5-P3, and 5-P5 are operated to perforate the digit 10.

It has already been explained how the perforated tapes are collected at periodic intervals and fed into a tape reader which transmits the perforated information over a communication channel to a centrally located data processing center. Upon reception at the data processing center, the received information is reperforated on business machine cards for further processing and is also used to control printing machines which print the received data on sheets of paper for visual study and inspection. Fig. 13 comprises a sample output from such a printing machine and represents data of the type which would be obtained during the scanning of the one hundred groups of Fig. 6.

Each line of Fig. 13 represents the quantity of information that is perforated on one business machine card. Referring to the top line, the first two digits, digits 11, comprise the office code and identify the office from which the remaining data on the line was received. The next two digits, also digits 11, comprise the group code and identify group 11. The next 12 digits on line 1 (343-123-61-0) represent the number of circuits found busy in each subgroup of group 11. In this connection, the dash (-) symbol represents the digit 0 while the printing of a 0 represents the digit 10. The next two digits on line 1, digits 12, are the group code for group 12. The next twelve digits (511145--63--) represent the number of circuits found busy in each subgroup of group 12. The next two digits, digits 13, identify group 13 while the following twelve digits indicate the number of circuits busy within each of the twelve subgroups of group 13. Following these are the group codes for groups 14 and 15, plus the occupancy data for each of these groups.

Line 1 contains seventy-two digits (two office code digits, plus seventy digits comprising the group codes for groups 11 through 15 and the occupancy data for these five groups). These seventy-two digits comprise all the information which can be perforated on a single eighty column business machine card without putting the data for the next group part on the first card and part on another. Therefore, the data for the next group, group 16, as well as groups 17, 18, 19 and 10, is perforated on the next business machine card. It should be noted that the first two digits perforated on each card are the first two digits of each line and comprise the office code, herein assumed to be 11.

The last five groups of the hundred are groups 06, 07, 08, 09 and 00 the data for which is printed on the bottom line of Fig. 13. Since the information pertaining to five groups is contained on a single line of Fig. 13 and perforated on a single business machine card, the occupancy data for one hundred groups obviously would comprise twenty lines on Fig. 13 and twenty business machine cards.

The translator and control circuit perforates various control symbols on the tape for controlling the operation of the printers at the data processing center. For example, after all the digits pertaining to the first five groups have been perforated, a carriage return and paper feed signal is perforated on the tape to cause the advance of the paper and the return of the carriage of the printer so that the next two digits as well as the remaining digits received for the next five groups will be typed immediately under the corresponding digits pertaining to the first five groups on line 1.

Figure 5:
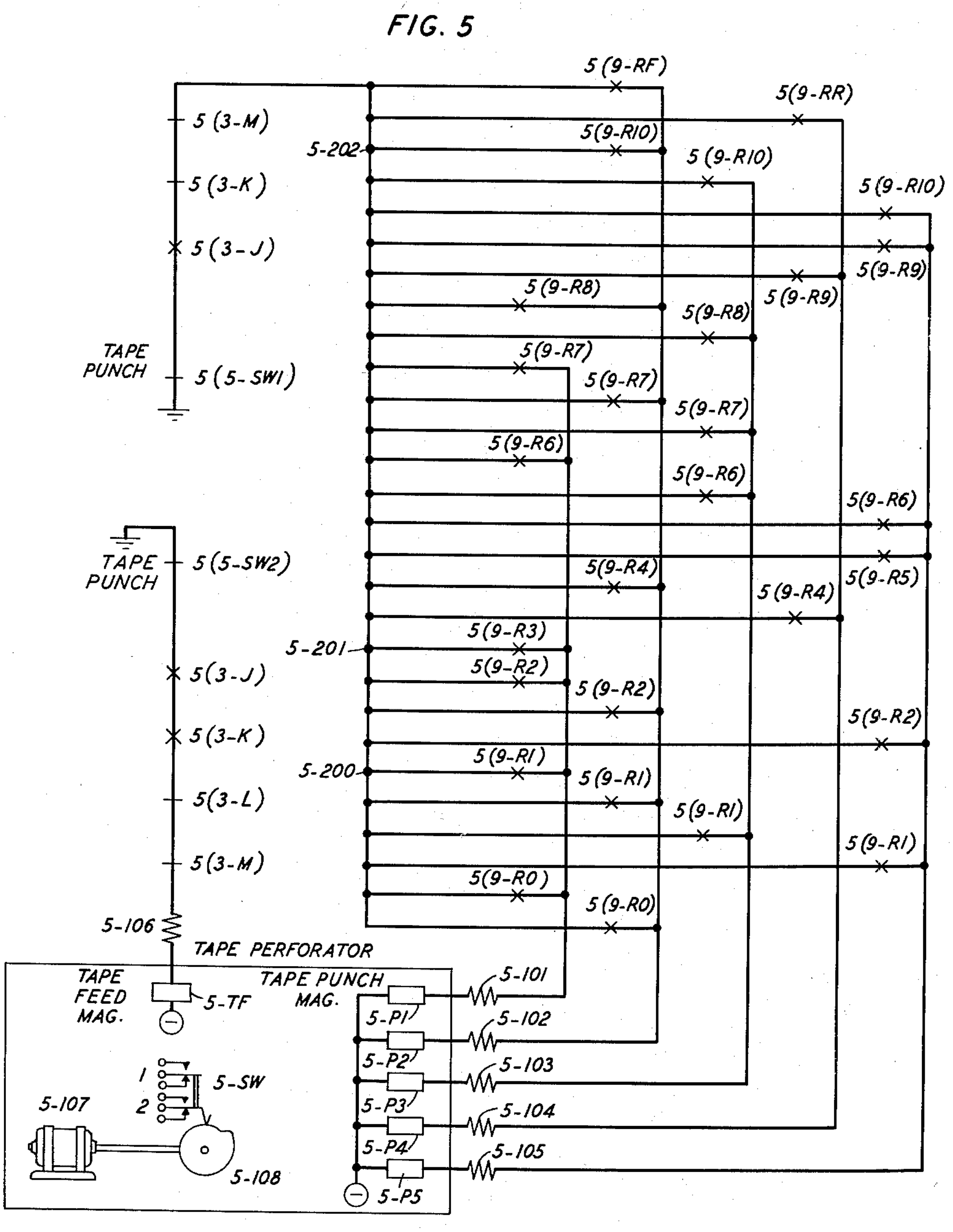

Fig. 5 shows a motor 5–107, a cam 5–108 and a switch 5–SW which is actuated once during each rotation of the cam. The switch has contact sets 1 and 2 associated therewith. The cyclic operation and release of these contacts provides the timing signals necessary to keep the operation of the translator and control circuit in synchronism with the perforator. The connections for these contacts are shown with the circuits controlled thereby.

2.0 DETAILED DESCRIPTION

*2.1 Perforation of office code*

The operation of the system is initiated by closing switch 6–101 which energizes motor 6–102, thereby causing rotor 6–104 to advance and engage the contacts in switch position 11. A circuit is now closed from negative battery on rotor 6–104, the contact in position 11, over the wire leading to relay 6–11 which now operates by virtue of the permanent ground on the other side of its winding. A circuit is now closed to operate relay 6–HA from ground on make contacts 6(6–11).

The operation of relay 6–HA closes a circuit to operate relay 4–ET from ground on make contacts 4(6–HA), break contacts 4(3–J), 4(4–Z), 4(4–Y), 4(4–ET′), to the winding of relay 4–ET. The operation of relay 4–ET closes a path from ground through make contacts 8(4–ET), through resistor 9–101 to the winding of relay 9–R1 to operate it. Relay 9–R1 operated closes a holding path for itself through resistor 9–101, make contacts 9(9–R1), break contacts on relays 9(9–R2) through 9(9–RF), break contacts 9(3–K), and make contacts 9(6–HA) to ground.

The rotation of cam 5–108 operates its assembled contact sets and extends ground through cam contacts 3(5–SW1) through break contacts 3(3–M), 3(3–J′), make contacts 3(9–R1), to the winding of relay 3–J to operate it. The operation of relay 3–J opens the previously described operating path for relay 4–ET. The removal of the operating ground from the winding of relay 4–ET extends a path through its make contacts 4(4–ET), break contacts 4(4–ET′) through the winding of relay 4–ET′, break contacts 4(4–Z) to ground. The current flowing through this path temporarily maintains relay 4–ET operated and operates relay 4–ET′. Relay 4–ET′ operated opens its break contacts 4(4–ET′), thereby opening the holding circuit for relay 4–ET and causing it to release. Relay 4–ET′ is held operated by its make contacts 4(4–ET′) and the battery potential connected to resistor 4–101. Relay 4–ET released opens an energizing path for relay 9–R1 which remains locked over its previously described holding path.

The make contacts of cam switch 5–SW release as cam 5–108 continues to rotate. The release of make cam contacts 3(5–SW1) removes the shunting ground from relay 3–J′ which now operates from ground on make contacts 3(6–HA), break contacts 3(3–M), winding of relay 3–J′, make contacts 3(3–J), through the winding of relay 3–J to negative battery. The current flowing over this path operates relay 3–J′ and maintains relay 3–J operated.

Break cam contacts 5(5–SW1) close as make cam contacts 3(5–SW1) open. The closure of these contacts extends a ground on Fig. 5 through make contacts 5(3–J), break contacts 5(3–K), 5(3–M), to terminal 5–200. The ground on terminal 5–200 is extended through make contacts 5(9–R1), resistor 5–101 to operate perforator magnet 5–P1 in the tape perforator. The ground on terminal 5–200 is also extended through an additional make contact 5(9–R1) through resistor 5–102 to operate perforator magnet 5–P2. The ground on terminal 5–200 is also extended to still another make contact 5(9–R1), resistor 5–103 to operate perforator magnet 5–P3. A similar circuit is extended to operate magnet 5–P5. The combined operation of perforator magnets 5–P1, 5–P2, 5–P3 and 5–P5 effects the perforation in the telegraph code of Fig. 2 of the digit 1 on the output tape of the perforator. These perforator magnets release as cam 5–108 continues to rotate, thereby reoperating switch 5–SW and causing break contacts 5(5–SW1) to open the energizing circuit for the perforator magnets.

The next closure of cam contacts 3(5–SW1) extends a ground through break contacts 3(3–M), make contacts 3(3–J), break contacts 3(3–K′) to the winding of relay 3–K thereby operating it. The operation of relay 3–K opens break contacts 9(3–K) in the holding circuit of relay 9–R1 thereby effecting its release. The next opening of make cam contacts 3(5–SW1) breaks the operating circuit for relay 3–K, thereby allowing relay 3–K′ to operate from ground through make contacts 3(6–HA), break contacts 3(3–M), winding of relay 3–K′, make contacts 3(3–K), the winding of relay 3–K to negative battery. The current flowing through this circuit operates relay 3–K′ and maintains relay 3–K operated. The release of the cam contacts recloses break contacts 5(5–SW2) to extend a ground through make contacts 5(3–J), 5(3–K), break contacts 5(3–L), 5(3–M), resistor 5–106 to the winding of the tape feed magnet 5–TF in the tape perforator. The operation of this magnet advances the tape preparatory to the perforation of the next digit. This magnet releases upon the subsequent opening of contacts 5(5–SW2).

Figure 4:
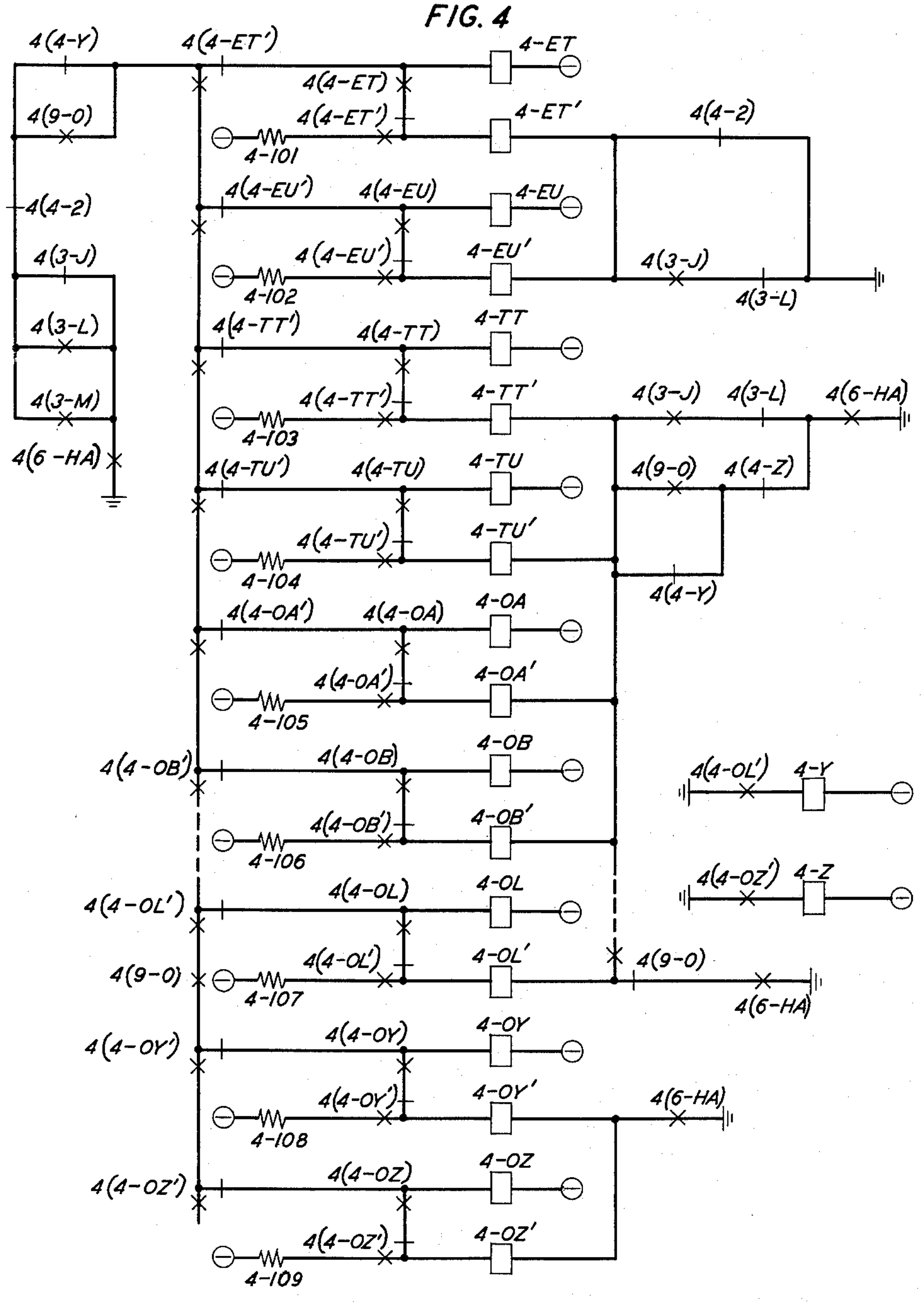

The next closure of cam contacts 3(5–SW1) extends a ground through break contacts 3(3–M), make contacts 3(3–J′), 3(3–K′), break contacts 3(3–L′) to the winding of relay 3–L to operate it. A ground on Fig. 4 is extended at this time through make contacts 4(6–HA), 4(3–L), break contacts 4(4–Z), 4(4–Y), make contacts 4(4–ET′), break contacts 4(4–EU′) to the winding of relay 4–EU to operate it. Relay 4–EU operated closes a path on Fig. 8 from ground through make contacts 8(4–EU), resistor 9–101 to the winding of relay 9–R1 which now operates and locks over a path including resistor 9–101, make contacts 9(9–R1), through break contacts on relays 9(9–R2) through 9(3–K), make contacts 9(6–HA) to ground.

The next release of the cam switches opens make contacts 3(5–SW1) which removes the shunting ground from relay 3–L′ thereby allowing it to operate from ground through make contacts 3(6–HA), break contacts 3(3–M), through the winding of relay 3–L′, make contacts 3(3–L) through the winding of relay 3–L to negative battery.

The next closure of cam contacts 3(5–SW1) extends a ground through break contacts 3(3–M), make contacts 3(3–J′), 3(3–K′), 3(3–L′), to the winding of relay 3–M to operate it. The operation of relay 3–M closes a holding path for itself from ground on contacts 3(5–SW1), make contacts 3(3–M), 3(6–HA) to the winding of relay 3–M. The operation of relay 3–M opens its break contacts 3(3–M) thereby effecting the release of relays 3–J, 3–J′, 3–K, 3–K′, 3–L and 3–L′. The next opening of make contacts 3(5–SW1) releases relay 3–M.

The next closure of contacts 3(5–SW1) operates relay 3–J over the previously described circuit. The operation of relay 3–J removes the operation ground from relay 4–EU, thereby permitting a holding current to flow from ground through break contacts 4(3–L), makes contacts 4(3–J), through the winding of relay 4–EU′, break contacts 4(4–EU′), make contacts 4(4–EU), through the winding of relay 4–EU to negative battery. This current temporarily maintains relay 4–EU operated and operates relay 4–EU′. The opening of break contacts 4(4–EU′) as relay 4–EU′ operates breaks the holding circuit for relay 4–EU thereby effecting its release. The operation of relay 4–EU′ closes a holding circuit for itself through its make contacts 4(4–EU′), resistor 4–102 to negative battery.

The next opening of contacts 3(5–SW1) removes the ground now shunting relay 3–J′ thereby allowing it to operate in series with relay 3–J as previously described.

The next closure of break contacts 5(5–SW1) extends a path from ground through make contacts 5(3–J), break contacts 5(3–K), break contacts 5(3–M) to terminal 5–200. From terminal 5–200 a ground is extended through four sets of make contacts 5(9–R1) to operate perforator magnets 5–P1, 5–P2, 5–P3, and 5–P5 which together effect the perforation of the digit 1 on the output tape. The perforator magnets release on the next opening of contacts 5(5–SW1).

The next closure of contacts 3(5–SW1) extends a ground through break contacts 3(3–M), make contacts 3(3–J′), break contacts 3(3–K′), to operate relay 3–K. The opening of break contacts 9(3–K) breaks the holding path for relay 9–R1 thereby effecting its release. The next opening of make contacts 3(5–SW1) removes the shunting path from relay 3–K′ thereby allowing it to operate in series with 3–K.

The next closure of break contacts 5(5–SW2) extends a ground through make contacts 5(3–J), 5(3–K), break contacts 5(3–L), 5(3–M), resistor 5–106 to operate relay 5–TF, thereby effecting a tape feeding operation preparatory to the perforation of the next digit. The next opening of break contacts 5(5–SW2) releases the tape feed magnet.

*2.2 perforation of the group code*

This section of the description pertains to the perforation of the group code on the output tape. The next closure of make contacts 3(5–SW1) extends ground through break contacts 3(3–M), make contacts 3(3–J′), 3(3–K′), break contacts 3(3–L′) to the winding of relay 3–L to operate it. The relay 3–L operated extends a ground on Fig. 4 from make contacts 4(6–HA), make contacts 4(3–L), break contacts 4(4–Z), 4(4–Y), make contacts 4(4–ET′), 4(4–EU′), break contacts 4(4–TT′), to the winding of relay 4–TT to operate it.

Figure 9:
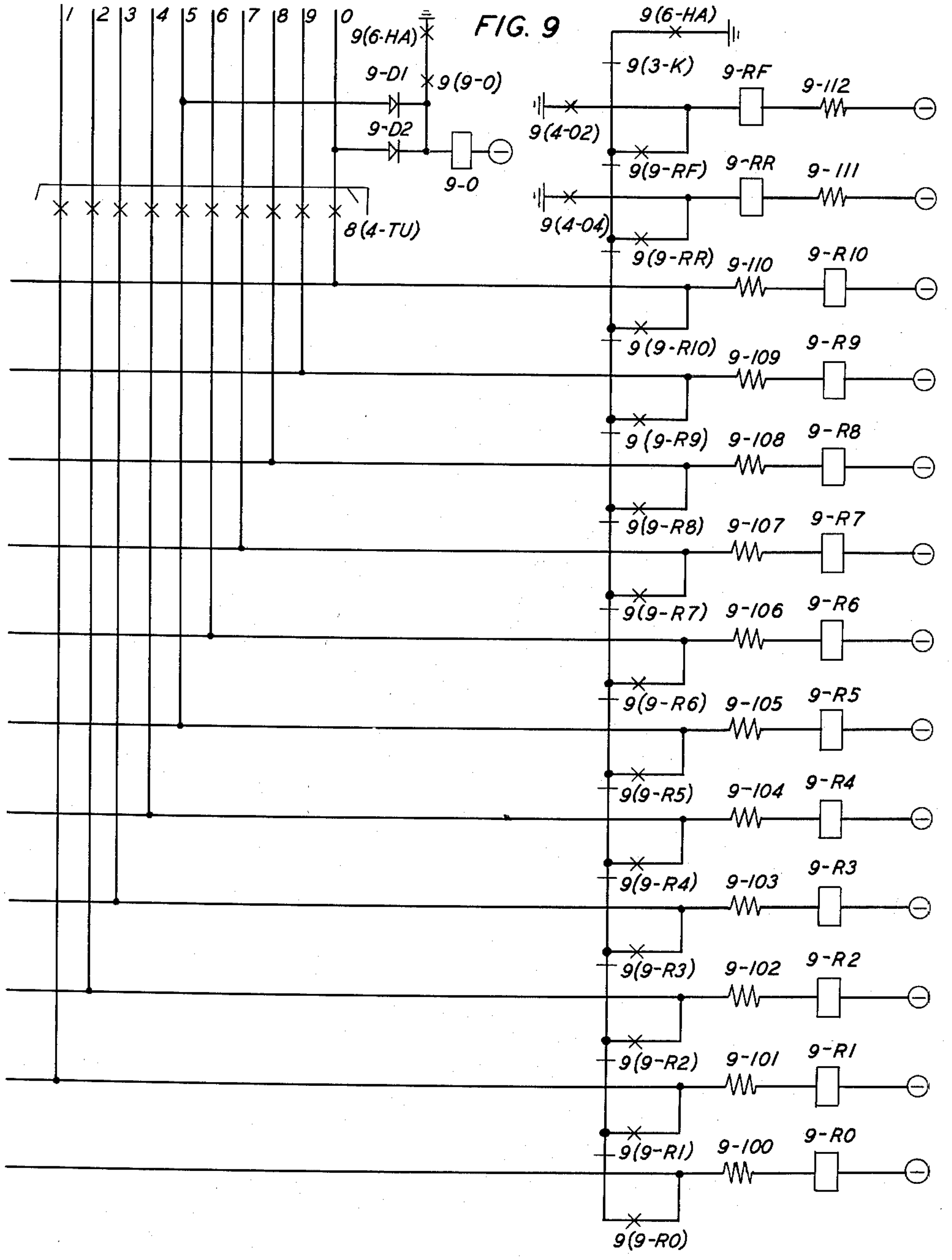
Figure 10:
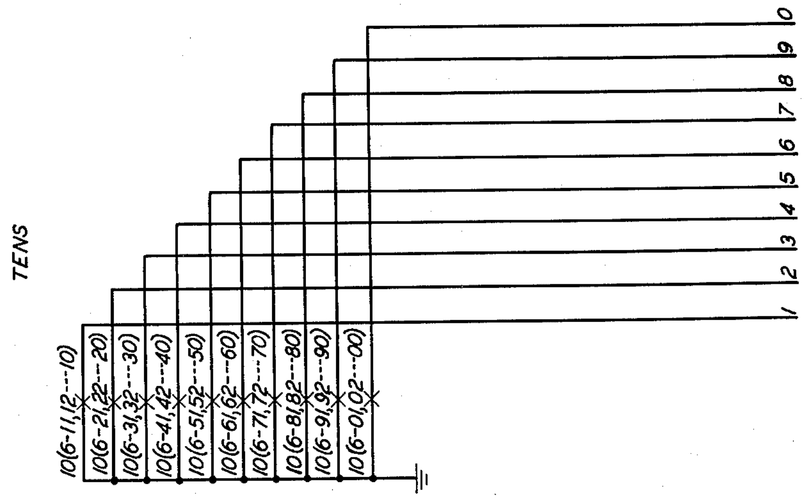

Relay 4–TT operated extends a ground on Fig. 10 through make contacts 10(6–11), make contacts 8(4–TT), resistor 9–101 to the winding of relay 9–R1 to operate it. Relay 9–R1 operated closes a locking path, in a manner similar to that already described, to ground on make contact 9(6–HA) on the upper right portion of Fig. 9.

The next opening of make contacts 3(5–SW1) removes the ground shunting relay 3–L′ which now operates in series with relay 3–L. The next closure of make contacts 3(5–SW1) extends a ground through break contacts of relay 3–M, make contacts of relays 3–M′, 3–K′ and 3–L′ to operate relay 3–M, which closes a holding path for itself through its own make contacts and make contacts of relay 6–HA. The operation of relay 3–M opens the holding paths for and effects the release of relays 3–J, 3–J′, 3–K, 3–K′, 3–L and 3–L′. The next opening of make contacts 3(5–SW1) opens the holding path for and releases relay 3–M.

The next closure of make contacts 3(5–SW1) extends a ground through break contacts of relays 3–M, 3–J′, make contacts of relay 9–R1, to operate relay 3–J. The operation of relay 3–J opens its break contacts 4(3–J) in the operating path for relay 4–TT thereby removing ground from its left-hand winding terminal. Relay 4–TT is momentarily held operated over a path to ground through make contacts 4(4–TT), break contacts 4(4–TT′), winding of relay 4–TT′, make contacts 4(3–J), break contacts 4(3–L), make contacts 4(6–HA) to ground. The current through this path operates relay 4–TT′ which opens its break contacts 4–TT′ to break the holding circuit for relay 4–TT, thereby effecting its release. Relay 4–TT′ remains operated to the negative battery supplied through its make contacts 4(4–TT′) and resistor 4–103. The next opening of make contacts 3(5–SW1) removes the shunting ground from relay 3–J′ and thereby allows it to operate in series with the winding of relay 3–J.

The next closure of break contacts 5(5–SW1) extends a ground through make contacts 5(3–J), break contacts 5(3–K), 5(3–M) to terminal 5–200. The ground on terminal 5–200 operates perforator magnets 5–P1, 5–P2, 5–P3 and 5–P5 to effect the perforation of the digit 1 on the output tape. The subsequent opening of break contacts 5(5–SW1) effects the release of the perforator magnets.

The next closure of make contacts 3(5–SW1) extends a ground to operate relay 3–K since 3–J and 3–J′ are locked operated. The operation of relay 3–K opens its break contacts 9(3–K) in the holding circuit for relay 9–R1 thereby effecting its release. The next opening of make contacts 3(5–SW1) removes the shunting ground from relay 3–K′ thereby allowing it to operate in series with relay 3–K. The next closure of break contacts 5(5–SW2) closes the previously described path on Fig. 5 to operate the tape feed magnet and thereby effect a tape feeding operation. The subsequent opening of these contacts releases the tape feed magnet 5–TF.

Relay 3–L operates upon the next closure of make contacts 3(5–SW1). Relay 3–L operated extends a ground on Fig. 4 through make contacts 4(6–HA), 4(3–L), break contacts 4(4–Z), 4(4–Y), make contacts 4(4–ET′), 4(4–EU′), 4(4–TT′), break contacts 4(4–TU′), to the winding of relay 4–TU to operate it. Relay 4–TU operated closes a path from ground on Fig. 11 through make contacts 11(6–11), make contacts 8(4–TU), resistor 9–101 to the winding of relay 9–R1 to operate it. Relay 9–R1 operated locks to ground on the make contacts 9(6–HA) in the upper right-hand corner of Fig. 9.

Relay 3–L′ operates on the next opening of make contacts 3(5–SW1). The next closure of these contacts operates relay 3–M which locks and effects the release of relay 3–J, 3–J′, 3–K, 3–K′, 3–L and 3–L′. Relay 3–M releases upon the next opening of contacts 3(5–SW1). Relay 3–J operates upon the next closure of contacts 3(5–SW1). The operation of relay 3–J opens the operation path of relay 4–TU at break contacts 4(3–J) thereby allowing relay 4–TU′ to operate from negative battery, through the winding of relay 4–TU, make contacts 4(4–TU), break contacts 4(4–TU′), winding of relay 4–TU′, break contacts 4(4–Y), 4(4–Z), make contacts 4(6–HA) to ground. The operation of relay 4–TU′ disconnects itself from the negative battery supplied from the winding of relay 4–TU to that on resistor 4–104. The opening of break contacts 4(4–TU′) opens the holding circuit for relay 4–TU thereby effecting its release.

The next opening of contacts 3(5–SW1) removes the shunt from the winding of relay 3–J′ thereby allowing it to operate in series with the winding of relay 3–J. The next closure of contacts 5(5–SW1) closes a circuit identical to that already previously described to effect the perforation of the digit 1 on the output tape. The operated punch magnets release upon the subsequent opening of these contacts. The next closure of contacts 3(5–SW1) operates relay 3–K. The subsequent opening of these contacts removes the shunt from relay 3–K′ thereby allowing it to operate in series with relay 3–K. The operation of relay 3–K breaks the holding path of relay 9–R1 thereby effecting its release. The next closure of break contacts 5(5–SW2) closes a path to operate the tape feed magnet 5–TF which effects a tape feeding operation. The subsequent release of these contacts releases the tape feed magnet.

The description so far has discussed in detail how the two digit office code and the two digit group code are perforated on the output tape. The office code was assumed herein to be 11 and therefore the digits 11 were perforated for the tens and units digit, respectively, of the office code. Also, since the first equipment group scanned is group 11, the tens and units digits of the group code whose perforation has just been described are also a 1.

Figure 8:
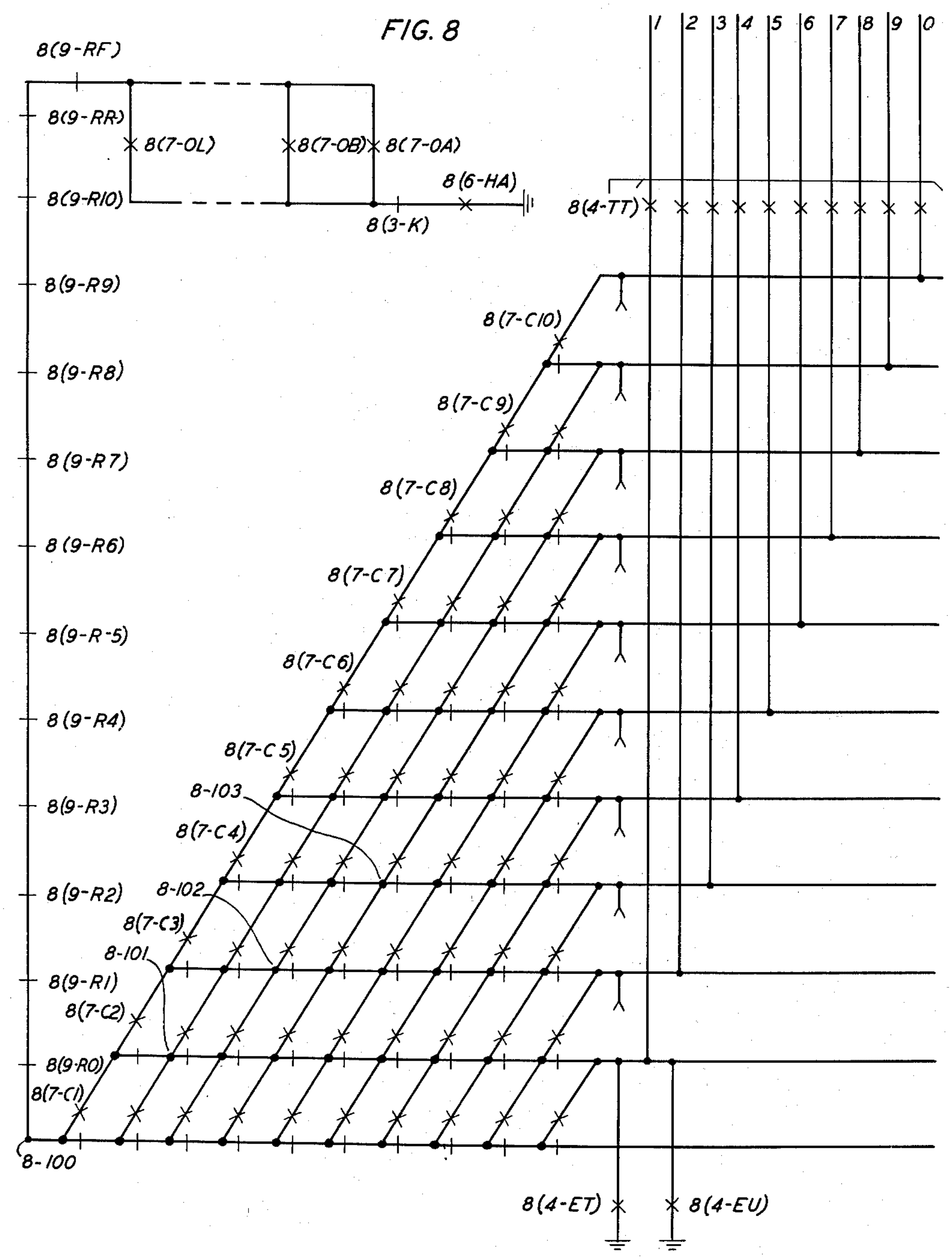

The determination of the digits to be perforated for the office code in under the control of the connections on Fig. 8 from ground through make contacts on relay 4–ET and 4–EU to the operating circuits for the various ones of relays 9–R0 through relay 9–R10. Both of these contacts on Fig. 8 supply grounds to operated relay 9–R1, which in turn effect the perforation of the digit 1 on the output tape for both the tens and units digits of the office code since the office code has been assumed to be 11. If the office code were 52, for example, make contacts 8(4–ET) would supply ground to operate relay 9–R5 while make contacts of relay 4–EU would supply ground to operate relay 9–R2.

The circuit of Fig. 10 determines the tens digit of the group code while the circuit of Fig. 11 determines the units digit of the group code. Since the first group is 11, make contacts of relay 6–11 on both Figs. 10 and 11 supply a ground through make contacts on relay 4–TT and 4–TU, respectively, to operate relay 9–R1 at the appropriate times, thereby effecting the perforation of the digits 11 on the tape.

*2.3 Perforation of the occupancy data*

2.31 PERFORATION OF THE OCCUPANCY DATA FOR THE FIRST SUBGROUP OF GROUP 11

The next closure of make contacts 3(5–SW1) extends a ground through break contacts 3(3–M), make contacts 3(3–J′), 3(3–K′), break contacts 3(3–L′), to the winding of relay 3–L to operate it. The operation of relay 3–L also closes a circuit on Fig. 4 from ground on make contacts 4(6–HA) through make contacts 4(3–L), break contacts 4(4–Z), 4(4–Y), make contacts 4(4–ET′), 4(4–EU′), 4(4–TT′), (4–TU′), break contacts 4(4–OA′) to the winding of relay 4–OA to operate it. The operation of relay 4–OA closes its ten make contacts on Fig. 7 to interconnect relays 7–C1 through 7–C10 with the first ten of the 120 circuits comprising group 11. Let it be assumed at this time that of these first ten circuits, only circuits 2, 4 and 6 are busy. Therefore, the grounds on leads 2, 4 and 6 from group 11 are extended through make contacts 7(4–OA), through resistors 7–102, 7–104, and 7–106, to the windings of relays 7–C2, 7–C4, and 7–C6, respectively, thereby operating them.

The next release of make contacts 3(5–SW1) removes the ground shunting relay 3–L′ thereby allowing it to operate in series with relay 3–L. Relay 3–M operates on the next closure of make contacts 3(5–SW1) and by means of its break contacts effects the release of relays 3–J, 3–J′, 3–K, 3–K′, 3–L and 3–L′. Relay 3–M releases upon the subsequent opening of make contacts 3(5SW1).

The release of relay 3K closes a path from ground on Fig. 8 through make contacts 8(6–HA), break contacts 8(3–K), make contacts 8(7–OA), break contacts 8(9–RF), 8(9–RR), break contacts 8(9–R10) through 8(9–R0) on relays 9–R10 through 9–R0, respectively, to terminal 8–100. The ground on terminal 8–100 is extended through a circuit comprising a plurality of relay contacts connected to form what is known in the art as an "any one- or more out-of-eleven" logic circuit. In other words, a ground on terminal 8–100 will be connected through to one of the eleven output wires on the right-hand portion of the circuit when any one or more of the eleven relays 7–C0 through 7–C10 are operated. It has been described how relays 7–C2, 7–C4 and 7–C6 are operated. Therefore, the ground on terminal 8–100 may be extended through break contacts 8(7–C1), make contacts 8(7–C2) to terminal 8–101. The ground on this terminal is extended through break contacts 8(7–C3), make contacts 8(7–C4), to terminal 8–102. The ground on this terminal is further extended through break contacts 8(7–C5), make contacts 8(7–C6) to terminal 8–103. The ground on this terminal is extended through break contacts on relays 8(7–C7) through 8(7–C10), resistor 9–103, to the winding of relay 9–R3 to operate it. The operation of this relay indicates that three of the ten circuits comprising the first subgroup of group 11 were found busy.

Relay 9–R3 operated closes a holding path for itself through resistor 9–103, make contacts 9(9–R3) through a series of break contacts on relays 9–R4 through 9–RF and 9(3–K), to ground on make contacts 9(6–HA). The operation of relay 9–R3 opens its break contacts 8(9–R3) thereby opening its own operating path as well as the operating path for any of relays 9–R0 through 9–R10.

The next closure of make contacts 3(5–SW1) extends a path from ground through break contacts 3(3–M), 3(3–J′), make contacts 3(9–R3), to the winding of relay 3–J to operate it. The operation of relay 3–J opens its break contacts 4(3–J), removes the ground from the left-hand winding terminal of relay 4–OA thereby closing a path from negative battery; winding of relay 4–OA, make contacts 4(4–OA), break contacts 4(4–OA′), winding of relay 4–OA′, break contacts 4(4–Y), 4(4–Z), make contacts 4(6–HA) to ground. The current flowing over this path momentarily holds relay 4–OA operated and operates relay 4–OA′. The opening of break contacts 4(4–OA′), as relay 4–OA′ operates, releases relay 4–OA by breaking its holding path. The closure of make contacts 4(4–OA′) closes a holding circuit for relay 4–OA′ to negative battery through resistor 4–105.

The next opening of make contacts 3(5–SW1) removes the shunting ground from relay 3–J′ thereby allowing it to operate in series with relay J. The next closure of break contacts 5(5–SW1) extends a ground through make contacts 5(3–J), break contacts 5(3–K), 5(3–M) to terminal 5–201. The ground on this terminal is extended through make contacts 5(9–R3), resistor 5–101 to operate perforator magnet 5–P1, which in accordance with the table of Fig. 2 effects the perforation of the digit 3 on the output tape. The next opening of break contacts 5(5–SW1) releases the perforator magnets.

The next closure of make contacts 3(5–SW1) operates relay 3–K which in turn effects the release of relay 9–R3 by opening break contacts 9(3–K). The next opening of make contacts 3(5–SW1) removes the shunting ground from relay 3–K′ thereby allowing it to operate in series with the winding of relay 3–K.

The next closure of break contacts 5(5–SW2) extends ground through make contacts 5(3–J), 5(3–K), break contacts 5(3–L), 5(3–M), through resistor 5–106 to operate the tape feed magnet thereby effecting a tape feeding operation preparatory to the perforation of the next digit. The subsequent opening of these contacts releases the tape feed magnet.

2.32 PERFORATION OF THE OCCUPANCY DATA FOR THE REMAINING ELEVEN SUBGROUPS OF GROUP 11

The circuit operations pertaining to the perforation of the occupancy data for the remaining eleven subgroups of group 11 are similar to that already described in section 2.31 wherein the digit 3 was perforated to indicate that three of the ten circuits in the first subgroup were busy. The circuit operation concomitant to the perforation of the remaining eleven digits are different from that already described only in that relays 4–OB, 4–OB′, through 4–OL and 4–OL′ together with their contacts are substituted for relays 4–OA and 4–OA′ together with their contacts in section 2.31. Also, the particular combination of relays 7–C1 through 7–C10 that are operated as each of the remaining subgroups are scanned depends on the number of individual circuits found busy within each subgroup. Therefore, the ground on terminal 8–100 in each case will be extended through the logic circuit to operate the one of relays 9–R0 through 9–R10 which represents the number of busy circuits per subgroup.

In this connection, relays 4–OB and 4–OB' together with their appropriate contacts should be substituted for relays 4–OA and 4–OA' during the scanning of the second subgroup while the succeeding ones of relay 4–OC and 4–OC' (not shown) through 4–OK and 4–OK' (not shown) should be substituted for relays 4–OA and 4–OA' during the scanning of the next ten subgroups of group 11.

After the perforation of the digit associated with the eleventh subgroup of group 11, the rest of the circuit, with the exception of Fig. 4, will be in the same condition as it was at the end of section 2.31, that is relays 3–J, 3–J', 3–K, 3–K' will be operated upon the completion of the tape perforation and tape feeding operation.

The next closure of make contacts 3(5–SW1) operates relay 3–L. The operation of relay 3–L extends a path on Fig. 4 from ground on make contacts 4(6–HA), 4(3–L), break contacts 4(4–Z), 4(4–Y), make contacts 4(4–ET'), 4(4–EU'), 4(4–TT'), 4(4–TU'), 4(4–OA'), 4(4–OB'), make contacts on relays 4–OC' through 4–OK' (not shown), break contacts 4(4–OL') to the winding of relay 4–OL to operate it. Contacts 7(4–06) of relay 4–OL operated interconnects relays 7–C1 through 7–C10 with the ten circuits of group 11 comprising the last subgroup. Assume that all ten circuits within the last subgroup are busy and, therefore, all of relays 7–C1 through 7–C10 are operated.

The next opening of make contacts 3(5–SW1) removes the ground shunting relay 3–L' and thereby allows it to operate in series with the winding of relay 3–L. The next closure of these contacts operates relay 3–M, which by means of its break contacts effects the release of relays 3–J, 3–J', 3–K, 3–K', 3–L and 3–L'. The release of relay 3–K closes a circuit on Fig. 8 to extend the ground on make contacts 8(6–HA), through break contacts 8(3–K) and over a previously described circuit to place ground on terminal 8–100. Since all of relays 7–C1 through 7–C10 are operated, the ground on terminal 8–100 is extended through make contacts 8(7–C1) through 8(7–C10) of the logic circuit, through resistor 9–110, to the winding of relay 9–R10 to operate it, thereby indicating that all ten circuits of the last subgroup of group 11 were busy.

Relay 3–M releases upon the next opening of make contacts 3(5–SW1). Relay 3–J operates upon the next closure of make contacts 3(5–SW1). The operation of relay 3–J removes the operating ground from the left-hand winding terminal of relay 4–OL thereby removing the shunting ground from the winding of relay 4–OL' so that it can operate in series with the winding of relay 4–OL. The operation of relay 4–OL opens its break contacts 4(4–OL') to effect the release of relay 4–OL and closes make contacts 4(4–OL') to close a holding circuit for itself to battery through resistor 4–107. Relay 4–OL' operated closes its make contacts 4(4–OL') to operate relay 4–Y.

The next opening of make contacts 3(5–SW1) removes the ground shunting relay 3–J' thereby allowing it to operate in series with relay 3–J. The next closure of break contacts 5(5–SW1) extends a ground through make contacts 5(3–J), break contacts 5(3–K), 5(3–M), to terminal 5–202. From there, the ground is extended through the three sets of make contacts 5(9–R10) to operate perforator magnets 5–P2, 5–P3 and 5–P5 which, in accordance with Fig. 2, effect the perforation of the digit 10 on the output tape. The next opening of break contacts 5(5–SW1) releases the perforator magnets. The next closure of make contacts 3(5–SW1) operates relay 3–K. The operation of relay 3–K opens its break contacts 9(3–K) to release relay 9–R10. The next opening of make contacts 3(5–SW1) removes the ground shunting relay 3–K' thereby allowing it to operate in series with relay 3–K.

The next closure of break contacts 5(5–SW2) operates the tape feed magnet on Fig. 5 to effect a tape feed operation preparatory to perforation of the next digit. The subsequent opening of these contacts releases the tape feed magnet.

The next closure of make contacts 3(5–SW1) operates relay 3–L. Relay 3–L operated opens its break contacts 4(3–L) which opens the holding paths for and effect the release of relays 4–TT', 4–TU', 4–OA', 4–OB' through 4–OK' (not shown). The next opening of make contacts 3(5–SW1) removes the shunting ground from the winding of relay 3–L' thereby allowing it to operate in series with the winding of relay 3–L. The next closure of these contacts operates relay 3–M which breaks the holding circuit for and effects the release of relays 3–J, 3–J', 3–K, 3–K', 3–L, 3–L'. Relay 3–M releases upon the next opening of these contacts.

Rotor 6–104 continues its advance and disengages itself from the contacts in position 11 thereby breaking the holding circuit for and effecting the release of relay 6–11. The release of this relay in turn releases relay 6–HA. The release of relay 6–HA opens its make contacts 4(6–HA) in the holding circuit for relay 4–OL' thereby releasing it. The release of relay 4–OL' in turn releases relay 4–Y. The entire circuit is now in a normal condition except for relays 4–ET' and 4–EU' which remain operated.

Summarizing briefly, at this point the circuit has just completed the scanning of the 12 subgroups comprising group 11 and, in response thereto, has effected the perforation of twelve digits indicating how many circuits in each of the twelve subgroups were occupied at the time of the scan. Prior to the perforation of these twelve digits, the two digit office code 11 and the group code 11 for the first group were first perforated on the tape. Thus, 14 digits have been perforated so far. These ultimately will be perforated on the first fourteen data columns of a business machine card.

2.33 PERFORATION OF THE OCCUPANCY DATA FOR GROUP 12

Rotor 6–104 continues its travel and eventually engages the contacts in position 12 of switch 6–105. At this time, a circuit is completed to operate relay 6–12 which, by means of its make contacts 6(6–12), effects the operation of relay 6–HA. The operation of relay 6–12 also closes its 120 make contacts to interconnect the 120 test leads from group 12 with the correspondingly designated conductors on Fig. 7.

Relay 6–HA operated closes a circuit on Fig. 4 from ground through make contacts 4(6–HA), break contacts 4(3–J), 4(4–Z), 4(4–Y), make contacts 4(4–ET'), 4(4–EU'), break contacts 4(4–TT') to the winding of relay 4–TT to operate it. The operation of 4–TT closes a circuit beginning on Fig. 10 from ground on make contacts 10(6–12), make contacts 8(4–TT), resistor 9–101 to the winding of relay 9–R1 to operate it. This relay operated indicates that the tens digit of the group code for the group now being scanned is a 1. Relay 9–R1 operated locks over the previously described path to ground on make contacts 9(6–HA) in the upper right-hand corner of Fig. 9.

The circuit operations continue in a manner similar to that already described so that the group code of 12 for the group now being scanned is first perforated on the output tape, followed by the perforation of twelve digits representing the number of occupied circuits in each of the twelve subgroups of group 12.

2.34 PERFORATION OF OCCUPANCY DATA FOR GROUPS 13 AND 14

Rotor 6–104 continues its advancement and sequentially engages the contacts in positions 13 and 14 of the switch. Relays 6–13 and 6–14 operate in sequence and, together with the rest of the circuit, each effects the perforation of a group code plus twelve digits per group representing the number of occupied circuits in each subgroup of groups 13 and 14.

2.35 PERFORATION OF THE OCCUPANCY DATA FOR GROUP 15

Relay 6–15 operates as the rotor 6–104 engages the contacts in position 15 of the switch. The operation of relay 6–15 interconnects the 120 test leads of group 15 with the correspondingly designated leads on Fig. 7. Also, the operation of relay 6–15 operates relay 6–HA. The operation of relay 6–HA together with the operation of relay 6–15 and the sequential operation of relays 4–TT and 4–TU effect the perforation of the group code 15 on the output tape. At this time, however, a circuit is closed from ground on Fig. 11 and make contacts 11(6–15), diode 9–D1 to the winding of relay 9–0 to operate it. Relay 9–0 operated closes a holding path for itself through its make contacts 9(9–0) to ground on make contacts 9(6–HA).

The entire circuit now functions in a manner similar to that already described to perforate the twelve digits representing the occupancy data for group 15. Relays 4–TT, 4–TT', 4–TU' and 4–OA' through 4–OL' operate in sequence and lock. Since relay 9–0 is operated, this chain of relays does not release, as before, upon the operation of relay 4–Y followed by the operation of relay 3–L since a holding path still remains through make contacts 4(9–0) in series with 4(4–Z) to ground on make contacts 4(6–HA). Make contacts 4(9–0) in the operating circuit for relays 4–OY and 4–OZ effectively adds these two relays together with their companion relays 4–OY' and 4–OZ' to the chain 4–TT through 4–OL so that the chain effectively counts two more cycles from the circuit of Fig. 3. Therefore, upon the next operation of relay 3–L, after relay 4–OL' operates and locks, relay 4–OY operates and, in a manner similar to that already described in connection with the prior relays in the chain of Fig. 4, effects the operation of relay 4–OY' and then releases. Relays 4–OZ and 4–OZ' operate upon the next cycle of relay 3–J.

Relay 4–OY operated operates relay 9–RR over an obvious circuit on Fig. 9. Relay 9–RR operated locks to ground on contacts 9(6–HA). The operation of relay 9–RR closes its make contacts 5(9–RR) on Fig. 5 to operate perforator magnet 5–P4 upon the next closure of break contacts 5(5–SW1). The operation of this one perforator magnet effects the perforation of a "carriage return" symbol on the output tape. Later, when the data on the tape is received at a processing center, this symbol causes the record control printer thereat to undergo a carriage return operation so that the subsequent information received and pertaining to the next five groups (groups 16 through 10) will be printed immediately beneath the corresponding data for the first five groups shown on Fig. 13.

The operation of relay 4–OZ operates relay 9–RF over an obvious circuit on Fig. 9. Relay 9–RF operated locks to the ground on make contacts 9(6–HA) in the upper right-hand corner of Fig. 9. Relay 9–RF operated closes its make contacts 5(9–RF) on Fig. 5 whereupon a path is closed to operate perforator magnet 5–P2 upon the next closure of break contacts 5(5–SW1). The operation of this perforator magnet effects the perforation of a "paper feed" symbol. This symbol, when received at the processing center, causes a paper feed operation by the record controlled printer thereat, thereby causing the paper shown on Fig. 13 to advance upward one line.

The operation of relay 4–OZ' operates relay 4–Z over an obvious circuit. The opening of break contacts 4(4–Z) allows relay 4–ET' and 4–EU', as well as relays 4–TT' through 4–OL' to release upon the subsequent operation of relay 3–L. Relays 4–OY' and 4–OZ' release upon the release of relay 6–HA.

The occupancy and identification data perforated so far and associated with the first five groups is all that can be placed on a single business machine card. The carriage return and paper feed symbols perforated on the tape are utilized by the card perforating machines at the data processing center as an "end of card" signal to effect a card feeding operation so that a fresh card will be fed to the perforating station preparatory to the reading and perforation of the data pertaining to the next five groups (groups 16 through 10).

The occupancy data and identification codes for five groups have now been perforated on the tape. This data eventually will be perforated on a first business card. The corresponding data for the next five groups will be perforated on a following card. Relays 4–ET and 4–EU, together with the rest of the circuit, now cause the office code to be perforated on the tape prior to the perforation of the occupancy data and group codes for the next five groups. This, in turn, causes the two digit office code to be perforated in the first two columns of the next card when the tape data is sent to the processing center.

2.36 PERFORATION OF OCCUPANCY DATA FOR GROUPS 16 THROUGH 00

Rotor 6–104 continues its operation and sequentially engages the contacts in each of positions 16 through 00 of switch 6–105 thereby effecting the sequential operation and release of relays 6–16 through 6–00. The circuit operations continue as already described so that the occupancy data as well as the necessary identification codes are perforated upon the operation of each of these relays. Groups 06 through 00 are the last five to be scanned and, therefore, the data pertaining thereto will be printed on the bottom line of Fig. 13 and perforated on the last one of the twenty business machine cards associated with a single scan of the one hundred groups.

Finally, rotor 6–104 moves beyond the contact in position 00 of the switch thereby releasing relay 6–00 and restoring the entire circuit to its normal condition. The operator concerned with the operation of this circuit will then release switch 6–101 to halt the operation of the rotor if another scanning cycle is not desired at this time. Alternatively, if continuous data is required, switch 6–101 may be left operated whereby the rotor 6–104 will continue to operate until it again engages the contacts in position 11 and the following subsequent positions of the switch, thereby effecting another scanning and recording cycle.

It is to be understood that the above-described arrangements are but illustrative of the application of the principles of the invention. Numerous other arrangements may be devised by those skilled in the art without departing from the spirit and scope of the invention.

What is claimed is:

1. In a data recorder for recording data pertaining to the occupancy of a plurality of groups of circuits each comprising a plurality of subgroups of circuits, a translator, a scanner for sequentially connecting said translator to each of said groups in succession, a subscanner for sequentially connecting said translator to the subgroups of circuits within each group, means under control of said translator for sequentially determining the number of occupied circuits in each subgroup as said translator is connected thereto, and means under control of said determining means for sequentially recording the occupancy data for each subgroup on an output medium.

2. In a data recorder for recording data pertaining to the occupancy of a plurality of groups of circuits each comprising a plurality of subgroups of circuits, a translator, a scanner for sequentially connecting said translator to each of said groups in succession, a sub-scanner for sequentially connecting said translator to each of said subgroups, means under control of said translator for sequentially indicating the number of occupied circuits in each subgroup as said translator is connected thereto, means under control of said indicating means for sequentially recording the occupancy data for each subgroup on an output medium, input means for receiving information pertaining to the identity of each group, means for recording the identity of each group on said medium, further input means for receiving information common to all of said groups, and means responsive to the receipt of said last-named information for recording it at predetermined intervals on said medium.

3. In a data recorder for recording data pertaining to the occupancy of a plurality of groups of circuits each comprising a plurality of subgroups of circuits, a translator, a scanner for sequentially connecting said translator to each of said groups in succession, a sub-scanner for sequentially connecting said translator to each of said subgroups, means under control of said translator for sequentially indicating the number of occupied circuits in each subgroup as said translator is connected thereto, means under control of said indicating means for sequentially recording the occupancy data for each group on an output medium, input means for receiving information common to all of said groups, and means responsive to the receipt of said information for recording it at predetermined intervals on said medium.

4. In a data recorder for recording data pertaining to the occupancy of a plurality of groups of circuits each comprising a plurality of subgroups of circuits, a translator, a scanner for sequentially connecting said translator to each of said groups in succession, a sub-scanner for sequentially connecting said translator to each of said subgroups, means under control of said translator for sequentially indicating the number of occupied circuits in each subgroup as said translator is connected thereto, means under control of said indicating means for sequentially recording the occupancy data for each group on an output medium, input means for receiving information pertaining to the identity of each group, and means for recording the identity of each group on said medium.

5. In a data recorder for recording data pertaining to the occupancy of a plurality of groups of circuits each comprising a plurality of subgroups of circuits, a translator, a scanner for sequentially connecting said translator to each of said groups in succession, a sub-scanner for sequentially connecting said translator to each of said subgroups, means under control of said translator for sequentially indicating the number of occupied circuits in each subgroup as said translator is connected thereto, and means under control of said indicating means for sequentially recording the occupancy data for each group on an output medium.

6. In a data recorder for recording data pertaining to the occupancy of a plurality of groups of circuits each comprising a plurality of subgroups of circuits, a translator, a first timing means, a scanner operable in synchronism with said first timing means for sequentially connecting said translator to each of said groups in succession, a perforator, a second timing means operable by said perforator, a sub-scanner operable under the control of said second timing means for sequentially connecting said translator to each of said subgroups of circuits in succession, means under control of said translator for sequentially indicating the number of occupied circuits in each subgroup as said translator is connected thereto, and means including said perforator operable under control of said translator for perforating the occupancy data for each subgroup on a paper tape.

References Cited in the file of this patent

UNITED STATES PATENTS 2,393,403 Ostline ---------------- Jan. 22, 1946